(12) United States Patent
Koc et al.

(10) Patent No.: US 8,532,030 B2
(45) Date of Patent: Sep. 10, 2013

(54) TECHNIQUES FOR INITIATING COMMUNICATION IN A WIRELESS NETWORK

(75) Inventors: Ali Koc, Hillsboro, OR (US); Rath Vannithamby, Portland, OR (US); Maruti Gupta, Portland, OR (US); Jie Hui, Mercer Island, WA (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 12/976,217

(22) Filed: Dec. 22, 2010

(65) Prior Publication Data

US 2011/0268052 A1 Nov. 3, 2011

Related U.S. Application Data

(60) Provisional application No. 61/330,837, filed on May 3, 2010.

(51) Int. Cl.
*H04W 4/00* (2009.01)
*H04L 12/28* (2006.01)
*H04L 12/56* (2011.01)

(52) U.S. Cl.
USPC ............................ 370/328; 370/389; 370/431

(58) Field of Classification Search
None
See application file for complete search history.

(56) References Cited

U.S. PATENT DOCUMENTS

| 6,189,033 | B1 * | 2/2001 | Jin et al. ....................... 709/225 |
| 6,463,047 | B1 * | 10/2002 | Cui et al. ....................... 370/337 |
| 6,816,500 | B1 * | 11/2004 | Mannette et al. ............. 370/431 |
| 7,327,681 | B2 | 2/2008 | Rhee et al. |
| 8,050,226 | B2 | 11/2011 | Park et al. |
| 2007/0110103 | A1 * | 5/2007 | Zimmerman et al. ........ 370/474 |
| 2008/0212591 | A1 | 9/2008 | Wu et al. |
| 2009/0067428 | A1 * | 3/2009 | Balandin et al. ............. 370/392 |
| 2009/0238135 | A1 * | 9/2009 | De et al. ........................ 370/329 |
| 2009/0271512 | A1 * | 10/2009 | Jorgensen .................... 709/224 |
| 2010/0008248 | A1 * | 1/2010 | Constantine et al. ......... 370/252 |
| 2011/0269493 | A1 | 11/2011 | Zhu et al. |
| 2011/0274059 | A1 | 11/2011 | Brown et al. |
| 2012/0250523 | A1 | 10/2012 | Miki |

FOREIGN PATENT DOCUMENTS

| JP | 2008300989 A | 12/2008 |
| KR | 10-2009-0013568 A1 | 2/2009 |
| WO | 2011/139462 A2 | 11/2011 |

OTHER PUBLICATIONS

Sections 16.2.3.47.1: AAI-DSA-REQ—16.2.3.47.3: AAI-DSA-ACK, Part 16: Air Interface for Broadband Wireless Access Systems, IEEE P802.16m/D9, Oct. 6, 2010, pp. 219-240.

(Continued)

*Primary Examiner* — Xavier S. Wong
(74) *Attorney, Agent, or Firm* — Schwegman, Lundberg & Woessner, P.A.

(57) ABSTRACT

Techniques are described for a device to request a new service flow for best effort (BE) category traffic to assign a priority to the new service flow. For example, a Traffic Priority parameter in a media access control (MAC) message can be used to transmit the priority level for a new BE category service flow. The MAC message can be an AAI DSA-REQ message (specified in IEEE 802.16m draft 9 (2010)). Either a base station or a mobile station can request a new service flow using the MAC message.

18 Claims, 4 Drawing Sheets

(56) References Cited

OTHER PUBLICATIONS

Sections 6.3.2.3.10 DSA-REQ message—6.3.2.3.11 DSA-RSP message, Part 16: AIr Interface for Broadband Wireless Access Systems, IEEE 802.16-2009, May 2009, pp. 120-122.

International Search Report and Written Opinion for PCT Application No. PCT/US2011/031200, Mailed on Nov. 25, 2011, 9 pages.

"U.S. Appl. No. 12/971,701, Non Final Office Action mailed Mar. 19, 2013", 9 pgs.

"Japanese Application Serial No. 2011-088841, Response filed Dec. 18, 2012 to Office Action mailed Sep. 18, 2012", 18 pgs.

"European Application Serial No. 11163386.3, Office Action mailed May 19, 2011", 2 pgs.

"European Application Serial No. 11163386.3, Response filed Jul. 13, 2011 to Office Action mailed May 19, 2011", 1 pg.

"International Application Serial No. PCT/US2011/031200, International Preliminary Report on Patentability mailed Nov. 15, 2012", 6 pgs.

"Japanese Application Serial No. 2011-088841, Office Action mailed Sep. 18, 2012", 5 pgs.

\* cited by examiner

TECHNIQUES FOR INITIATING COMMUNICATION IN A WIRELESS NETWORK

RELATED ART

This application is related to U.S. Patent Application No. 61/330,837, filed May 3, 2010 and claims priority therefrom.

FIELD

The subject matter disclosed herein relates generally to techniques for prioritizing traffic for transmission.

RELATED ART

Prioritization of traffic is an important feature in networking. In some cases, prioritization allows time and delay sensitive packets to traverse the network more rapidly. For example, IEEE 802.16-2009 at section 6.3.5 describes five different quality of service (QoS) scheduling priorities for different application requirements at the subscriber station for uplink content transmission and at the base station for downlink content transmission. IEEE 802.16-2009 describes the use of Extended Real-Time Polling Service (ertPS) for voice communications and best effort (BE) classification for data communications. BE is described in section 6.3.5.2.4 of IEEE 802.16-2009. For example, various internet connections are assigned BE classification: HTTP, FTP, as we well as voice over IP (VoIP). Voice transmitted over ertPS is given higher priority than voice transmitted using a BE connection. BE classification is also used for less time and delay sensitive traffic such as HTTP and FTP. Accordingly, a VoIP call that is delay and loss sensitive will not receive higher priority than an FTP communication, which is not as delay or loss sensitive. When the network is loaded, the VoIP traffic can suffer unacceptable delays because of its BE flow classification.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, 3GPP standards, physical layer description of 3GPP LTE advanced 36211 release 10, and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Various embodiments provide a manner for a device that requests a new service flow for BE category traffic to assign a priority to the new service flow. For example, a Traffic Priority parameter in a media access control (MAC) message can be used to transmit the priority level for a new BE category service flow. The MAC message can be an AAI dynamic service addition (DSA)-REQ message (specified in IEEE 802.16m draft 9 (2010)). Traffic priority can be transmitted in a MAC message from either a base station to a mobile station or a mobile station to a base station.

For downlink communications, highest priority packets are scheduled for transmission first. If there are left over resources, lower priority packets can be scheduled for transmission. For uplink communications, a mobile station makes a bandwidth request for each flow and includes priority information for the flow. The base station can grant highest priority bandwidth requests before lower priority bandwidth requests.

Figure 1:
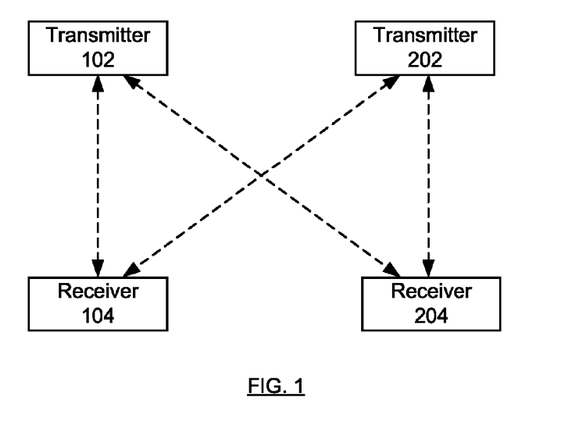
FIG. 1 depicts an example of devices connected using a wireless network.

FIG. 1 depicts an example of devices connected using a wireless network. The network can be compliant with any variety of IEEE 802.16 or 3GPP LTE as well as variations and revisions thereof. In the downstream or downlink case, the generically-named transmitters 102 and/or 202 above may be interchangeably referred to as a base station (BS) or enhanced Node B (eNB) or access point (AP). In this downlink case, the receivers 104 and/or 204 above may be interchangeably referred to as a mobile station (MS) or subscriber station (SS) or user equipment (UE) or station (STA) at the system level herein. Further, the terms BS, eNB, and AP may be conceptually interchanged, depending on which wireless protocol is being used, so a reference to BS herein may also be seen as a reference to either of eNB or AP. Similarly, a reference to MS or SS herein may also be seen as a reference to either of UE or STA.

Figure 2:
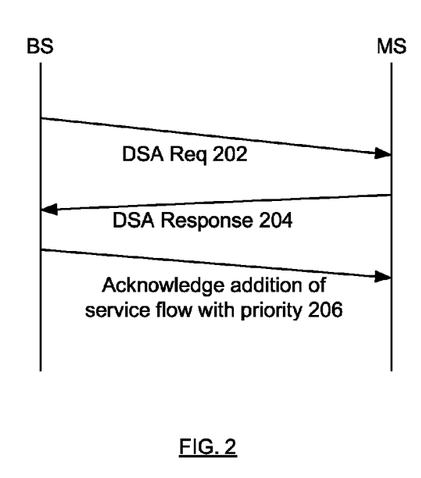
FIG. 2 depicts a manner in which a base station requests a new service flow with a mobile station.

FIG. 2 depicts a manner in which a BS requests a new service flow with a mobile station. When a scheduler in the BS receives a packet that is unassigned to any service flow based on the packet's source/destination ports and source/destination IP addresses, the scheduler can determine a priority of a service flow belonging to a BE class. The scheduler in the BS determines a priority for a new service flow and requests the media access controller of the BS to send a MAC message to a particular MS to initiate a new BE service flow. The unassigned source and destination ports and unassigned source and destination IP addresses can be source and destination ports and source and destination IP addresses that are not currently allocated in the BS. The MAC message can be a DSA request. The DSA request is to request a new downlink service flow. The received packet can be associated with a new service flow. A flow can be a unique connection between a BS and MS.

When the BS initiates addition of a new service flow, the BS assigns priority for each data flow or BE flow. Various techniques can be used to determine traffic priority for the new service flow. In some cases, the BS determines the priority level based on one or more of latency values, bit error rate (BER), and packet error rate (PER). An application that requests a service flow can specify a latency value and PER for the service flow. The BER can be determined based on the packet size and PER. In some cases, each packet has 100 bits. In some cases, the scheduler of the BS assigns the highest priority for the lowest latency service flow and ignores BER/PER. However, if there is no latency requirement, then the scheduler can assign the highest priority to the lowest BER.

In some embodiments, the DSA request includes a Traffic Priority parameter as well as a maximum latency parameter. The Traffic Priority parameter can be transmitted when the flow request is for best effort (BE) quality of service traffic. The Traffic Priority parameter can be three (3) bits. Accordingly, any of eight (8) priority levels can be assigned to the new service flow. Other numbers of priority levels can be assigned. Traffic priority can be established for both uplink and downlink service flows. Table 734 of IEEE 802.16m draft 9 (2010) shows a format of a DSA Req message with Traffic Priority indicator as well as a parameter L that specifies a maximum latency for a flow. The parameter L can be specified by the application and transmitted in the DSA request.

In some embodiments, a new service flow is assigned priority according to its latency parameters. If the service flow has a low latency requirement, the service flow will get a high priority even if the service flow is the only BE class flow. For example, the following priorities can be assigned: A VoIP application can be assigned priority 7, a gaming application can be assigned priority 2, an HTTP application can be assigned priority 1, and an FTP application can be assigned priority 0. The BS can assign the same priority to different service flows. Accordingly, multiple HTTP flows can be assigned the same traffic priority level.

Operators can define priority based on factors other than latency. For example, new service flows from some applications can be granted higher priority regardless of latency. For example, if a user is connecting to an IEEE 802.16 network using a Sony Play Station, the Play Station console could give higher priority to gaming application then the other applications. Preferred treatment can be given based on the console or computing device that is accessing the network.

Some applications specify a packet loss sensitivity. For example, in video decoding, some packets contain content that is integral to decoding video. If packet loss sensitivity is specified, then the BS scheduler can decrease BER/PER for the service flow and the adjusted BER/PER can be used to determine priority.

At 202, the BS transmits a MAC message to an MS to initiate a new BE service flow. The MAC message can be a DSA request. In some cases, the DSA request can be an AAI-DSA-REQ message defined in Table 734 of IEEE 802.16m draft 9 (2010) and the message also includes a Traffic Priority parameter and latency value.

The MAC of the receiving MS processes the DSA request. In many cases, the MS accepts the received DSA request to establish a new BE service flow. At 204, the MS transmits a DSA RSP message to the BS that indicates acceptance of the DSA request. The DSA RSP can be a format described in Table 735 of Section 16.2.3.47.2 of IEEE 802.16m draft 9 (2010).

In connection with acceptance of the DSA request, the MS can create an uplink queue for the new BE service flow with the assigned priority. If a BE class uplink queue with the assigned priority is already available, then the new BE service flow can use the available BE class uplink queue with the assigned priority. MS scheduler will schedule higher QoS classes (e.g., ertPS and Unsolicited Grant Service (UGS)) then the remaining resources will be scheduled from BE service flows. The MS performs prioritization management for packets from the queue allocated for the new BE service flow using the Traffic Priority parameter in the received DSA request.

The scheduler of the MS schedules highest priority packets from queues for transmission using allocated uplink bandwidth. Next highest priority packets from queues are scheduled for transmission with remaining uplink bandwidth. For example, if an MS requests 20 bits for uplink transmission and the BS allocates 10 bits for uplink transmission, then the MS prioritizes the highest priority service flow for the allocated 10 bits. If there are multiple service flows with the highest priority, then they equally share the allocated uplink bandwidth.

At 206, the BS acknowledges setting up of the new service flow to the MS. In some cases, a DSA ACK message is used to acknowledge setting up a service flow is set up. Thereafter, the MS and BS can communicate using the new service flow. The BS can also create a BE queue with the specified priority level. If a BE class uplink queue with the assigned priority is already available, then the BE class uplink queue with the assigned priority can be used. Schedulers of the MS and BS can utilize the priority and latency to determine when to transmit content from the BE queue.

Figure 3:
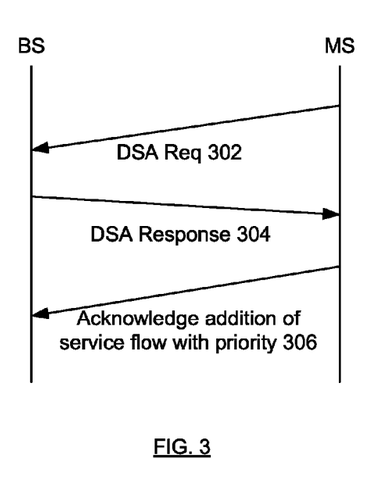
FIG. 3 depicts a manner in which a mobile station initiates a new service flow with a base station.

FIG. 3 depicts a manner in which an MS initiates a BE new service flow with a BS. When a scheduler in the MS receives a packet with unassigned source and destination ports and unassigned source and destination IP addresses, the scheduler determines a priority for a new BE service flow and requests the media access controller of the MS to send a MAC message to its BS to initiate a new BE service flow. Similar to the case where the BS initiates a new BE service flow (FIG. 2), the MAC message can be a DSA request that includes a Traffic Priority parameter and latency value. Priority can be determined in a similar manner to that described with regard to FIG. 2. At 302, an MS transmits a DSA request to the BS for the new BE service flow.

Unlike the case of FIG. 2, the BS can reject the priority assigned to the new service flow or the new service flow request regardless of the priority. For example, a BS could reject a priority because the BS lacks capacity for the new service flow with the requested priority or because the MS does not have a sufficiently high subscription to receive the requested priority. The requested priority may provide the MS with higher uplink or downlink bandwidth than the MS's user has paid for. A confirmation code attribute in a DSA RSP message can be used to indicate rejection of the new service flow request regardless of whether the rejection is made based on priority or inability to handle a new service flow. DSA RSP message is described for example in Table 735 of IEEE 802.16m draft 9 (2010).

If the BS rejects the new BE service flow request, the MS can request a new service flow with the same priority one or more times or the MS can request a new service flow with lower priority one or more times.

At 304, the BS transmits a DSA RSP message to the MS to indicate acceptance or rejection of the new service flow request.

At 306, the MS transmits an acknowledgement of a service flow addition to the BS. In some cases, a DSA ACK message is used to acknowledge setting up a new service flow. Both the BS and MS can create a BE class queue with the specified priority level. If a BE class uplink queue with the assigned priority is already available, then the new BE service flow can use the available BE class uplink queue with the assigned priority. Schedulers of the MS and BS can utilize the priority and latency to determine when to transmit content from the BE queue. Thereafter, the MS and BS can communicate using the new service flow.

Figure 4:
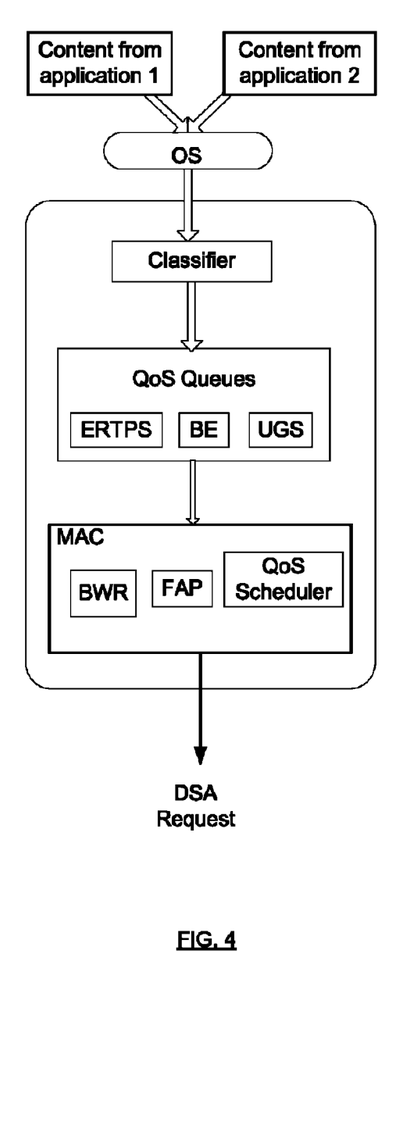
FIG. 4 depicts a system that can be used by a mobile station in accordance with an embodiment.

FIG. 4 depicts a system that can be used by an MS in accordance with an embodiment. An application layer (not depicted) between the applications and the classifier forms the packet with appropriate headers and with content from the applications. The classifier maps application packets to different QoS queues based on the type of content to be transmitted. Classifier assigns packets to ERTPS, UGS, or BE queues. Local classifier can map packets to different BE queues based on priority levels. In some embodiments, there are eight (8) different priority levels for BE queues. Other numbers of priority levels and queues can be used. However, the number of BE queues can be less than the number of available priority levels. For example, if three BE flows have been established, then only three BE queues may be allocated. In some embodiments, the priority levels of the BE queues can be set by a MAC message, such as a DSA request message, received from a BS that requests formation of a new service flow. The priority levels of the BE queues in the MS can be set in connection with establishing a new BE class service flow with a link partner, e.g., a BS.

A QoS scheduler is to schedule transmission of packets from queues based on the priority of the queue. For example, strict priority queuing can be used where contents of higher priority queues can be transmitted before contents of lower priority queues. Other scheduling mechanisms can be used such as weighted round robin, deficit weighted round robin, hierarchical fair service curve, weighted fair queuing, and class based weighted fair queuing.

Bandwidth request aggregator (BWR) is to aggregate bandwidth requests and request bandwidth from a BS.

Fragmentation assembly and packing block (FAP) is to aggregate MAC service data units (MSDUs) from queues of the same connection (CID) to a single MAC protocol data unit (MPDU). A single header can be used to transmit packets from multiple queues. In some cases, a single MSDU can generate multiple MPDUs.

In addition, the MAC can form and transmit DSA REQ messages that request a new service flow.

Figure 5:
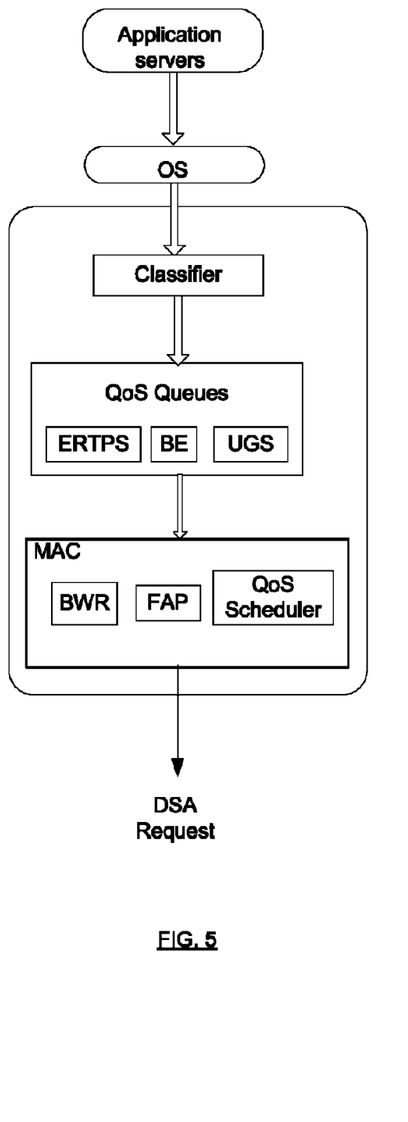
FIG. 5 depicts a system that can be used by a base station in accordance with an embodiment.

FIG. 5 depicts a system can be used by a BS in accordance with an embodiment. The system of FIG. 5 is similar to the system of FIG. 4 except that the system receives content from application servers and communications are made to an MS. In some embodiments, the priority levels of the BE queues in the system of FIG. 5 can be set by a MAC message, such as a DSA request message, received from an MS that requests formation of a new service flow. The priority levels of the BE queues in the BS can be set in connection with establishing a new BE class service flow with a link partner, e.g., a BS.

Figure 6:
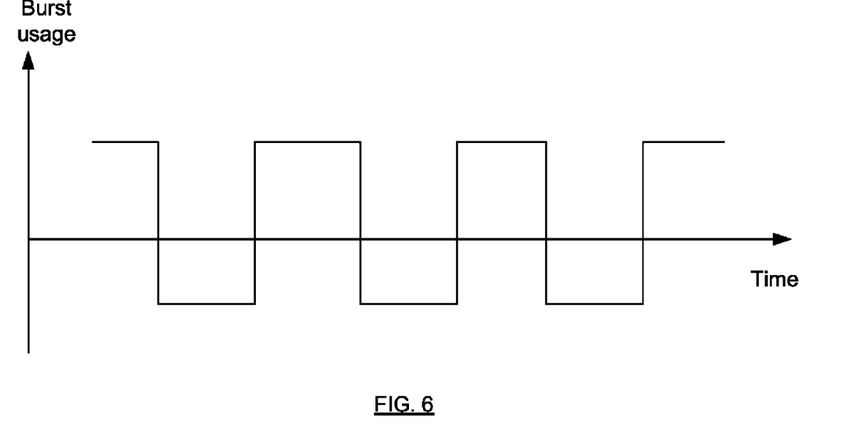
FIG. 6 shows an example downlink burst usage over time where both downlink FTP and voice uses coincide.

FIG. 6 shows an example downlink (DL) burst usage over time where both DL FTP and voice uses coincide. The DL burst usage varies considerably when both FTP and voice usages occur simultaneously.

Figure 7:
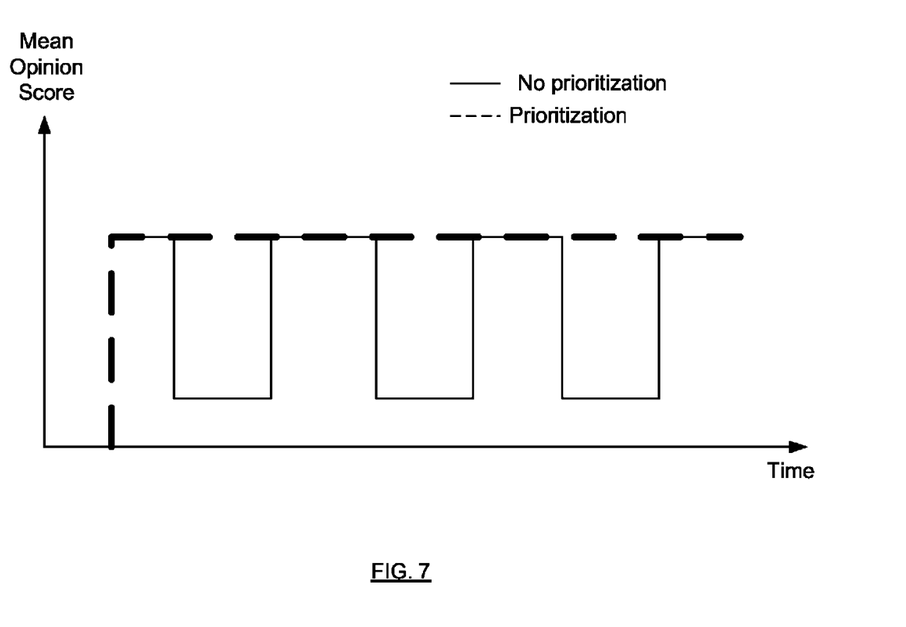
FIG. 7 shows Mean Opinion Score (MOS) values for voice communication over time.

FIG. 7 shows Mean Opinion Score (MOS) values for voice communication over time. When all of the users are on best effort service flow, FTP traffic can throttle back the voice traffic. Using traffic priority information for BE traffic, acceptable MOS for voice quality can be obtained even if the FTP users send their data simultaneously.

Figure 8:
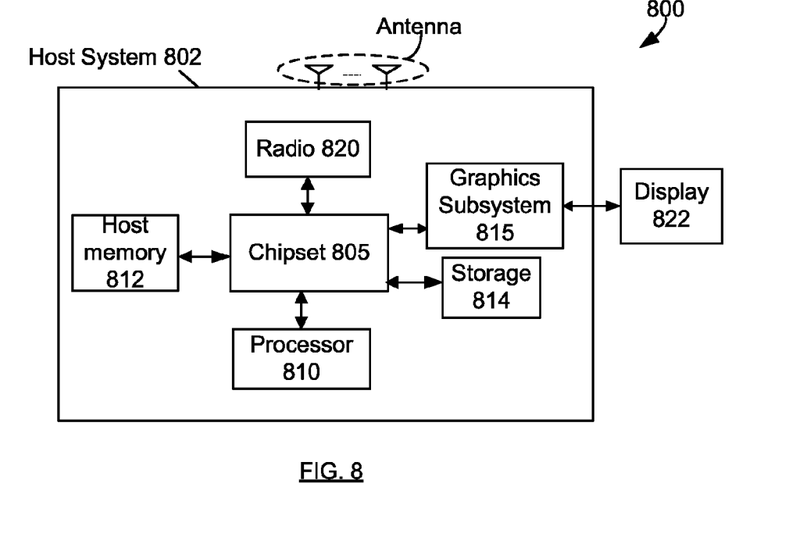
FIG. 8 provides an example of a system in accordance with an embodiment.

FIG. 8 provides an example of a system in accordance with an embodiment. Computer system 800 may include host system 802 and display 822. Computer system 800 can be implemented in a handheld personal computer, mobile telephone, set top box, or any computing device. Any type of user interface is available such as a keypad, mouse, touch screen, and/or gesture or motion recognition. Host system 802 may include chipset 805, processor 810, host memory 812, storage 814, graphics subsystem 815, and radio 820. Chipset 805 may provide intercommunication among processor 810, host memory 812, storage 814, graphics subsystem 815, and radio 820. For example, chipset 805 may include a storage adapter (not depicted) capable of providing intercommunication with storage 814.

Processor 810 may be implemented as Complex Instruction Set Computer (CISC) or Reduced Instruction Set Computer (RISC) processors, x86 instruction set compatible processors, multi-core, or any other microprocessor or central processing unit. In various embodiments, processor 810 can be configured with instructions to perform techniques described herein.

Host memory 812 may be implemented as a volatile memory device such as but not limited to a Random Access Memory (RAM), Dynamic Random Access Memory (DRAM), or Static RAM (SRAM). Storage 814 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 815 may perform processing of images such as still or video for display. An analog or digital interface may be used to communicatively couple graphics subsystem 815 and display 822. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805.

Radio 820 may include one or more radios capable of transmitting and receiving signals in accordance with applicable wireless standards such as but not limited to any version of IEEE 802.11 and IEEE 802.16. For example, radio 820 may include at least a physical layer interface and media access controller. The media access controller can be used in communications for new service flow establishment described herein.

Figure 9:
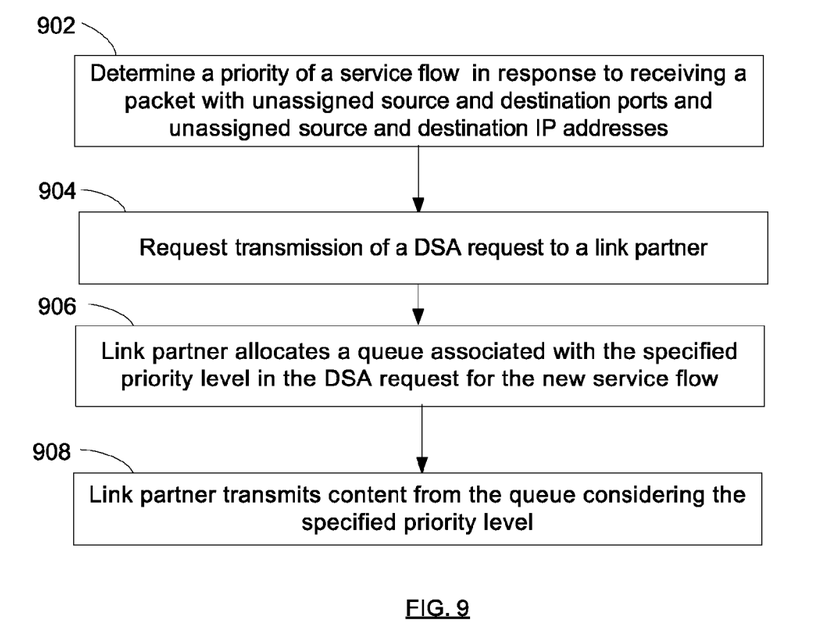
FIG. 9 depicts a process in accordance with an embodiment.

FIG. 9 depicts a process in accordance with an embodiment. The process of FIG. 9 can be used by either a base station or a mobile station to initiate a new service flow.

Block 902 can include a determining a priority of a service flow in response to receiving a packet with an unassigned source and destination ports and unassigned source and destination IP addresses. Determination of the priority can be made based on criteria described with regard to FIG. 2.

Block 904 can include requesting transmission of a DSA request to a link partner. If the device requesting transmission is a mobile station, the link partner can be a base station. If the device requesting transmission is a base station, the link partner can be a mobile station. The DSA request is to include the Traffic Priority parameter that is determined in block 902 as well as latency information. Latency information can be specified by an application that requested transmission of the packet.

Block 906 can include the link partner allocating a BE class queue associated with the specified priority level in the DSA request for the new service flow. If a BE class uplink queue with the assigned priority is already available, then the BE class uplink queue with the assigned priority can be used for the new service flow. In some cases, the link partner may reject the specified priority level and indicate rejection in a DSA RSP message.

Block 908 can include the link partner transmitting content from the BE class queue considering the specified priority level.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method performed by using a wireless mobile communication device in which content is scheduled for transmission based on a quality-of-service (QoS) priority level of an associated QoS class of a plurality of QoS classes that includes a best effort (BE) class, the method comprising:
   determining a priority level of a service flow belonging to the BE class in response to receiving a packet for transmission, wherein service flows belonging to the BE class are to have one of a plurality of different BE class priority levels, the packet being unassigned to any service flow based on its source/destination ports and source/destination IP addresses;
   requesting a new BE class service flow, the requesting comprising requesting transmission of a media access control (MAC) message to a link partner, the MAC message being a dynamic service addition (DSA) request (REQ) (DSA-REQ) and includes the determined BE class priority level; and
   receiving one of acknowledgement of formation of the requested BE class service flow or rejection of the requested BE class service flow,
   wherein the BE class includes a plurality of BE class service flows including the requested new BE class service flow, each BE class service flow associated with one of the BE class priority levels,
   wherein the plurality of BE class service flows are scheduled for transmission within the BE class based on the BE class priority level associated with a BE class service flow,
   wherein the QoS classes further include an extended real-time Polling Service (ertPS) class and an Unsolicited Grant Service (UGS) class, the ertPS class and the UGS class both having a higher QoS priority for scheduling than the BE class, and
   wherein voice and video BE service flows are assigned a higher BE class priority level than hypertext transfer protocol (HTTP) and file transfer protocol (FTP) BE service flows.

2. The method of claim 1, wherein the DSA request includes at least one of a Traffic Priority parameter to specify the determined BE class priority level and a latency value associated with the BE class service flow.

3. The method of claim 1, wherein the determining a BE class priority level of a service flow comprises:
receiving a latency parameter associated with the packet received for transmission; and
assigning a highest BE class priority level for a lowest latency parameter.

4. The method of claim 1, wherein the determining a BE class priority level of a BE service flow comprises:
receiving a bit error rate associated with the packet received fir transmission; and
assigning a highest BE class priority level for a lowest bit error rate service flow.

5. The method of claim 1, further comprising:
allocating at least one BE class queue associated with the determined BE class priority level for the new BE class service flow, wherein each BE class priority level allocated a different BE class queue, and
scheduling content for transmission from a BE class queue among the at least one allocated BE class queue based on a BE class priority level of the content.

6. The method of claim 1, further comprising:
requesting at least one more new best effort (BE) class service flow with the same or a less lower BE class priority level in response to receiving rejection of the requested BE class service flow.

7. The method of claim 1, wherein the method is performed by one of a base station or a mobile station.

8. The method of claim 1 wherein the DSA request is an advance-air interface (AAI) DSA-REQ configured in accordance with an IEEE 802.16 specification.

9. A method performed by using a wireless mobile communication device in which content is scheduled for transmission based on a quality-of-service (QoS) priority level of an associated QoS class of a plurality of QoS classes that includes a best effort (BE) class, the method comprising:
determining a priority level of a service flow belonging to the BE class in response to receiving a packet for transmission, wherein service flows belonging to the BE class are to have one of a plurality of different BE class priority levels, the packet being unassigned to any service flow based on its source/destination ports and source/ destination IP addresses;
requesting a new BE class service flow, the requesting comprising requesting transmission of a media access control (MAC) message to a link partner, the MAC message being a dynamic service addition DSA request (REQ) (DSA-REQ) and includes the determined BE class priority level; and
receiving one of acknowledgement of formation of the requested BE class service flow or rejection of the requested BE class service flow,
wherein the BE class includes a plurality of BE class service flows including the requested new BE class service flow, each BE class service flow associated with one of the BE class priority levels,
wherein the plurality of BE class service flows are scheduled for transmission within the BE class based on the BE class priority level associated with a BE class service flow, and
wherein the determining a BE class priority level of a service flow comprises:
assigning a higher BE class priority level for voice or video communication service flows;
assigning a medium BE class priority level for hypertext transfer protocol (HTTP) communications; and
assigning a lower BE class priority level for file transfer protocol (FTP) communications.

10. A system in which content is scheduled for transmission based on a quality-of-service (QoS) priority level of an associated QoS class of a plurality of QoS classes that includes a best effort (BE) class, the system comprising:
at least one antenna;
a radio communicatively coupled to at least one antenna; and
a processor configured to:
determine a priority level of a service flow belonging to the BE class in response to receiving a packet for transmission, wherein service flows belonging to the BE class are to have one of a plurality of different BE class priority levels, the packet being unassigned to any service flow based on its source/destination ports and source/destination IP addresses; and
request a new BE class service flow, the requesting comprising requesting transmission of a media access control (MAC) message to a link partner, the MAC message being a dynamic service addition (DSA) request (REQ) (DSA-REQ) and includes the determined BE class priority level,
wherein the BE class includes a plurality of BE class service flows including the requested new BE class service flow, each BE class service flow associated with one of the BE class priority levels,
wherein the plurality of BE class service flows are scheduled for transmission within the BE class based on the BE class priority level associated with a BE class service flow,
wherein the processor is further configured to allocate at least one BE class queue to each of the BE class service flows,
wherein the QoS classes further include an extended real-time Polling Service (ertPS) class and an Unsolicited Grant Service (UGS) class, the ertPS class and the UGS class both having a higher QoS priority for scheduling than the BE class, and
wherein voice and video BE service flows are assigned a higher BE class priority level than hypertext transfer protocol (HTTP) and file transfer protocol (FTP) BE service flows.

11. The system of claim 10, wherein the DSA request includes a latency value associated with the new BE service flow.

12. The system of claim 10, wherein determine a BE class priority level of a BE service flow, the processor is to:
assign a highest BE class priority level for a lowest latency parameter or a lowest bit error rate, the lowest latency parameter or a lowest bit error rate associated with the packet received for transmission.

13. A system in which content is scheduled for transmission based on a quality-of-service (QoS) priority level of an associated QoS class of a plurality of QoS classes that includes a best effort (BE) class, the system comprising:
at least one antenna;
a radio communicatively coupled to at least one antenna; and
a processor configured to:
determine a priority level of a service flow belonging to the BE class in response to receiving a packet for transmission, wherein service flows belonging to the BE class are to have one of a plurality of different BE class priority levels, the packet being unassigned to any service flow based on its source/destination ports and source/destination IP addresses; and request a new BE class service flow, the requesting comprising requesting transmission of a media access control (MAC) message to a link partner, the MAC message being a dynamic service addition (DSA) request (REQ) (DSA-REQ) and includes the determined BE class priority level, wherein the BE class includes a plurality of BE class service flows including the requested new BE class service flow, each BE class service flow associated with one of the BE class priority levels, wherein the plurality of BE class service flows are scheduled for transmission within the BE class based on the BE class priority level associated with a BE class service flow, wherein the processor is further configured to allocate at least one BE class queue to each of the BE class service flows, and wherein to determine a BE class priority level of a BE service flow, the processor is to:

assign a higher BE class priority level for voice or video communication service flows;

assign a medium BE class priority level for hypertext transfer protocol (HTTP) communications; and assign a lower BE class priority level for file transfer protocol (FTP) communications.

14. The system of claim 10, wherein the processor is also configured to:

request to allocate at least one BE class queue associated with the determined BE class priority level for the new BE class service flow and request to schedule content for transmission from one or more of the at least one BE class queue based on a BE class priority level of the content.

15. The system of claim 10, wherein the processor is also configured to:

request at least one more new best effort (BE) class service flow with the same or a less BE class priority level in response to receiving rejection of the requested new BE class service flow.

16. A non-transitory computer-readable medium having instructions stored thereon, which when executed by one or more processors, cause the one or more processors to perform operations comprising:

determine a priority level of a service flow belonging to the BE class in response to receiving a packet for transmission, wherein service flows belonging to the BE class are to have one of a plurality of different BE class priority levels, the packet being unassigned to any service flow based on its source/destination ports and source/destination IP addresses;

request a new BE class service flow, the requesting comprising requesting transmission of a media access control (MAC) message to a link partner, the MAC message being a dynamic service addition (DSA) request (REQ) (DSA-REQ) and includes the determined BE class priority level;

request to allocate a BE class queue associated with the determined BE class priority level, each BE class priority level having an associated BE class queue; and request to schedule content for transmission from a BE class queue among at least one allocated BE class queue based on a priority level of the content, wherein the BE class includes a plurality of BE class service flows including the requested new BE class service flow, each BE class service flow associated with one of the BE class priority levels, wherein the plurality of BE class service flows are scheduled for transmission within the BE class from the BE class queue based on the BE class priority level associated with a BE class service flow, and wherein the DSA request includes a Traffic Priority parameter to specify the determined BE class priority level and includes a latency value associated with the BE service flow.

17. The computer-readable medium of claim 16, wherein to determine a BE class priority level of a service flow, the computer is to:

assign highest BE class priority level for a lowest latency parameter or a lowest bit error rate associated with the packet received for transmission.

18. The computer-readable medium of claim 16, wherein to determine a BE class priority level of a service flow, the computer is to:

assign a higher BE class priority level for a voice or video communication service flows;

assign a medium BE class priority level for hypertext transfer protocol (HTTP) communications; and assign a lower BE class priority level for file transfer protocol (FTP) communications.

* * * * *

UNITED STATES PATENT AND TRADEMARK OFFICE
CERTIFICATE OF CORRECTION

PATENT NO. : 8,532,030 B2  
APPLICATION NO. : 12/976217  
DATED : September 10, 2013  
INVENTOR(S) : Koc et al.

Page 1 of 1

It is certified that error appears in the above-identified patent and that said Letters Patent is hereby corrected as shown below:

On Title Page 2, in column 1, Item (56) under "Other Publications", line 5, delete "Mailed" and insert --mailed--, therefor In the Claims

In column 9, line 14, in Claim 4, delete "fir" and insert --for--, therefor In column 9, line 50, in Claim 9, delete "DSA" and insert --(DSA)--, therefor In column 10, line 50, in Claim 12, after "wherein", insert --to--, therefor In column 11, line 33, in Claim 14, delete "flow" and insert --flow;--, therefor Signed and Sealed this  
Twenty-fourth Day of December, 2013

Margaret A. Focarino  
*Commissioner for Patents of the United States Patent and Trademark Office*